Feb. 24, 1948.   T. SVET   2,436,617
WELDING TORCH
Filed March 21, 1945
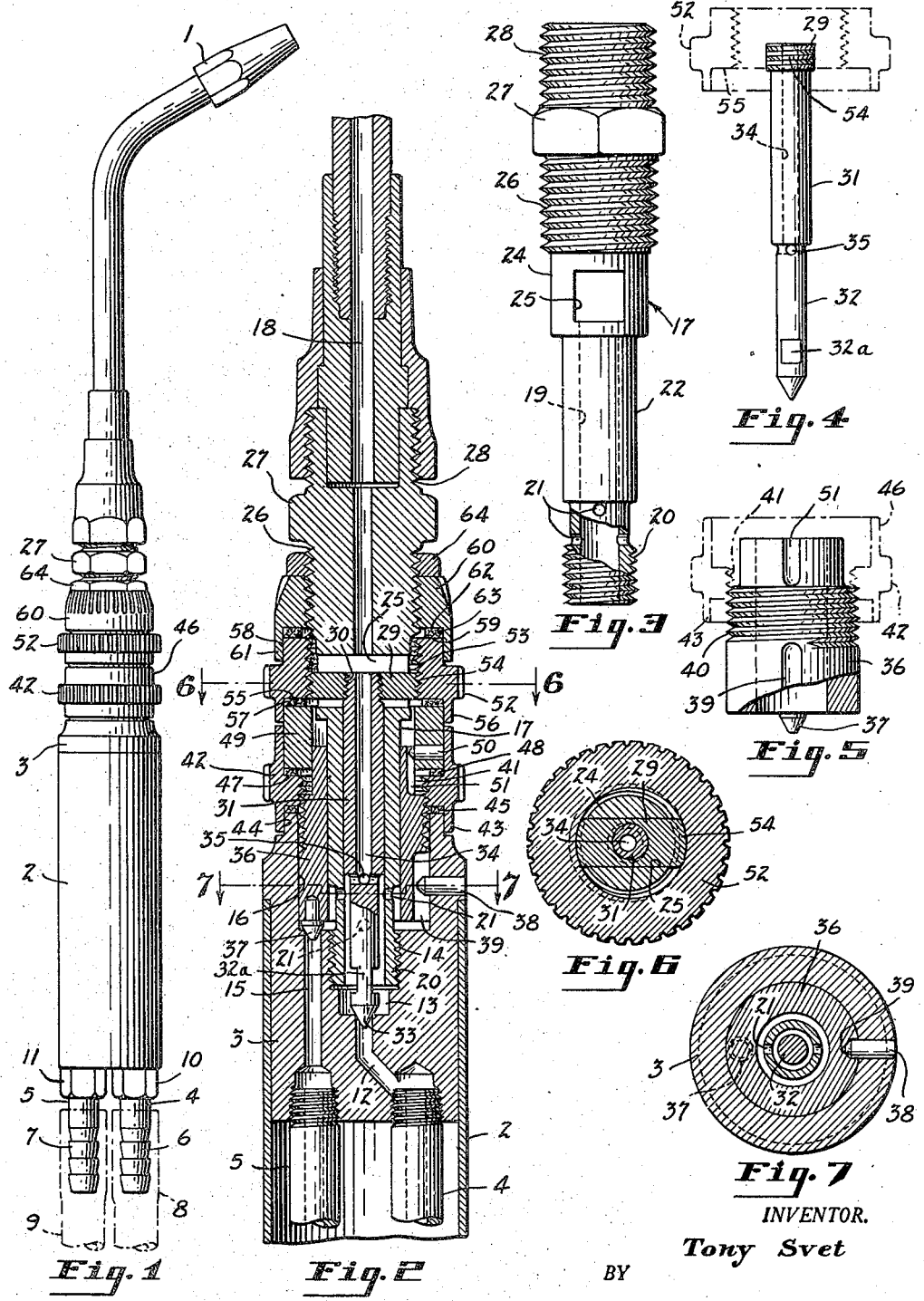
INVENTOR.
Tony Svet
BY
Evans + McCoy
ATTORNEYS Patented Feb. 24, 1948

2,436,617

UNITED STATES PATENT OFFICE 2,436,617

WELDING TORCH

Tony Svet, Cleveland, Ohio

Application March 21, 1945, Serial No. 583,934

9 Claims. (Cl. 158—27.4)

This invention relates to welding and cutting torches of the type in which combustible fluid mixed with oxygen is delivered under pressure to the nozzle and in which the oxygen and combustible fluid are delivered through valve controlled passages to a mixing chamber so that the relative proportions of the fluids delivered to the nozzle may be regulated.

The main object of the present invention is to provide conveniently located valve actuators that can be quickly and easily manipulated to vary the character of the flame at the nozzle tip.

A further object of the invention is to provide valve actuators so constructed and so mounted on the torch body that they are not likely to be damaged by rough handling.

With the above and other objects in view, the invention may be said to comprise the device as illustrated in the accompanying drawings hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a side elevation of a torch embodying the invention,

Fig. 2 is an axial section through the torch body showing the same on an enlarged scale, Fig. 3 is a side elevation of the nozzle coupling, Fig. 4 is a side elevation of the central valve member looking toward a threaded end of the elongated head of the valve member and indicating the threaded ring which acts upon the head to adjust the valve member in dotted lines, Fig. 5 is a side elevation of the tubular valve carrying member with the ring for adjusting the valve carrying member indicated in dotted lines, Fig. 6 is a section taken on the line indicated at 6—6 in Fig. 2, and Fig. 7 is a section taken on the line indicated at 7—7 in Fig. 2.

Referring to the accompanying drawings, the torch of the present invention comprises a body member having a conventional nozzle 1 that is carried by a hand grip portion 2 to which it is attached. The hand grip portion 2 may be in the form of a cylindrical tube closed by a suitable head 3 at its outer end and having tubes 4 and 5 therein that are attached to the head 3 and that extend through the inner end of the hand grip portion and terminate in nipples 6 and 7 to which flexible tubes 8 and 9 may be attached for delivery of oxygen and a combustible fluid such as acetylene from suitable storage tanks. The tubes 4 and 5 may be clamped to the inner end of the hand grip portion 2 by means of nuts 10 and 11.

A passage 12 in the head 2 connects the outer end of the tube 4 with a recess 13 at the inner end of an internally threaded bore 14 formed in the head 3. A passage 15 alongside the bore 14 connects the outer end of the tube 5 to a counterbore 16 in the head 3. The nozzle 1 is attached to the hand grip portion 3 by means of a coupling member 17. The gaseous mixture is delivered to the nozzle 1 through a passage 18 that extends into the outer end of the coupling member 17. The coupling member 17 has an axial bore 19 extending from its inner end that is of larger diameter than the passage 18. The inner end 20 of the coupling member 17 is externally threaded and screws into the threaded bore 14 of the head 3.

Adjacent the inner end of the threaded portion 20 the coupling member 17 has radial apertures 21 that establish communication between the bore 19 of the coupling member and the surrounding space in the counterbore 16. Outwardly of the apertures 21 the member 17 has a cylindrical portion 22 of slightly larger diameter than the apertured portion and outwardly of the cylindrical portion 22 there is a second cylindrical portion 24 somewhat larger in diameter than the portion 22. An axially elongated slot 25 extends diametrically through the cylindrical portion 24 for a purpose that will presently be explained.

Outwardly of the cylindrical portion 24 the coupling member has a threaded portion 26 and a hex portion 27 by means of which the coupling member may be screwed tightly into the threaded bore 14.

The nozzle may be attached to the coupling member 17 in any suitable way. As herein shown the nozzle is formed in sections the inner of which is attached to the coupling member 17 by threaded engagement with a threaded portion 28 at the outer end of the coupling member.

A cross head 29 is slidably mounted in the diametrical slot 25 and has a central threaded aperture 30 into which a stem 31 is screwed. The stem 31 has a sliding fit in the bore 19 of the coupling member and has a lower end portion 32 of reduced diameter which provides a mixing chamber at the inner end of the coupling member where the apertures 21 are provided. At its inner end the stem 31 has a conical valve 33 that is adapted to close the passage 12 and the stem 31 is adjustable to regulate the flow from the passage 12 into the mixing chamber. The lower end portion 32 of the stem 31 has notches 32a formed on opposite sides thereof to provide flat wrench receiving faces.

The stem 31 has an axial passage 34 that extends from its outer end and which registers with the passage 18 to the nozzle. The passage 34 terminates adjacent the outer end of the reduced portion 32 of the stem and communicates with the space around the reduced portion 32 through lateral apertures 35. Fluid under pressure delivered to the passage 12 passes into the recess 13 and into the lower end of the bore 19 of the coupling member 17 and thence through the apertures 35 into the passage 34 which delivers into the passage 18 leading to the nozzle.

An externally and internally cylindrical tubular member 36 fits within the counterbore 16 and upon the exterior of the cylindrical portion 22 of the coupling member 17 and is adapted to slide axially within the counterbore 16 and upon the inner cylindrical member 22. The tubular member 36 carries a conical valve 37 at its inner end that is adapted to close the passage 15 and to regulate the flow from the passage 15 into the mixing chamber, the fluid passing from the passage 15 into the annular space surrounding the inner end of the coupling member, through the apertures 21 into the mixing chamber and from the mixing chamber through the apertures 35 into the passage 34. A radially disposed pin 38 in the head 3 projects into the counterbore 16 and engages in a longitudinal slot 39 in the tubular member 36. The pin 38 and slot 39 serve to hold the tubular member 36 against turning movements and maintains the valve 37 in axial alinement with the passage 15.

Outwardly of the slot 39 the tubular member 36 has an externally screw threaded portion 40 that is engaged by an internally threaded portion 41 of a thumb ring 42 that is adapted to be turned to adjust the tubular member 36 axially so as to regulate the flow of fluid through the passage 15. The thumb ring 42 is counterbored on the inner side to provide a cylindrical flange 43 that fits upon a cylindrical bearing portion 44 at the outer end of the head 3, and, to make the connection fluid tight, a packing ring 45 may be interposed between the thumb ring 42 and the end of the head 3. The thumb ring 42 has a counterbore on its outer side that provides an outer cylindrical flange 46 and an outer shoulder 47. A packing ring 48 is seated on the shoulder 47 and a bearing ring 49 fits within the flange 46 and seats against the packing ring 48. The bearing ring 49 is held against turning movements by means of a pin 50 that engages in an axial slot 51 in the tubular member 36 and provides a bearing for an outer thumb ring 52 that has an internally threaded portion 53 that engages screw threads 54 formed on the ends of the cross head 29 for imparting axial movements to the stem 31 and the valve 33 carried thereby. The inner side of the ring 52 is counterbored to provide a shoulder 55 facing the outer end of the bearing ring 49 and a cylindrical flange 56 that fits upon the outer end of the ring 49, suitable packing 57 being interposed between the shoulder 55 and the outer end of the ring 49. The thumb ring 52 has an outer cylindrical portion 58 and an end shoulder 59, and a cap nut 60 screwed on the threaded portion 26 of the coupling member has a flange 61 that fits upon the cylindrical portion 58 of the thumb ring 52 and a shoulder 62 opposed to the end shoulder 59 of the thumb ring. A packing ring 63 is interposed between the shoulders 59 and 62 of the thumb ring and cap nut, and the cap nut is secured in adjusted position upon the coupling member by means of a lock nut 64 threaded on the portions 26 outwardly of the nut 60. The interfitting rings 42, 49 and 52 are clamped together and held against axial movements between the nut 60 on the coupling member 17 and the outer end of the head 3, to which the coupling member 17 is attached.

By properly adjusting the cap nut 60, the thumb rings 42 and 52 and the intermediate bearing ring 49 may be clamped together with sufficient pressure to form fluid tight seals between them without clamping these members to an extent sufficient to interfere with their independent rotation.

During operation of the torch, the operator gripping the portion 2 may engage the thumb rings 42 and 52 with his thumb or with his thumb and index finger so that the two valves 32 and 37 may be instantly adjusted to change the character of the flame issuing from the torch as desired.

It is to be understood that variations and modifications of the specific device herein shown and described for purposes of illustration, may be made without departing from the spirit of the invention.

What I claim is:

1. A torch comprising a body having a hand grip portion with a nozzle attached thereto, said body having a mixing chamber communicating with the nozzle and two passages for supplying fluid to said chamber, two axially movable valve members having telescopically connected coaxial portions within said body, each valve controlling one of said passages and said coaxial portions being screw threaded, means restraining turning movements of each valve member, a thumb ring for actuating each valve member, each ring having a screw thread engaging the screw threaded portion of a valve member, and means for holding each ring against axial movements.

2. A torch comprising a body having a hand grip portion with a nozzle attached thereto, said body having a mixing chamber communicating with said nozzle and two passages delivering into the inner end of said chamber, an axially movable tubular member, a valve carried by said member for controlling one of said passages, and an axially movable valve member within said tubular member for controlling the other passage.

3. A torch comprising a body having a hand grip portion with a nozzle attached thereto, said body having a mixing chamber communicating with said nozzle and two passages delivering into the inner end of said chamber, a fixed tubular axially extending guide member within said body, a tubular member slidable upon the exterior of said guide member, a member slidable upon the interior of the guide member, said interior and exterior members having valve portions controlling said passages, and means for actuating said valve carrying members.

4. A torch comprising a body having a hand grip portion with a nozzle attached thereto, said body having a mixing chamber communicating with said nozzle and two passages delivering into the inner end of said chamber, a fixed tubular axially extending guide member within said body, a tubular member slidable upon the exterior of said guide member, a member slidable upon the interior of the guide member, said interior and exterior members having valve portions controlling said passages, and a pair of thumb rings rotatably mounted upon said body adjacent the nozzle attached end of said hand grip portion and operatively connected to said valve carrying members to actuate the same.

5. A torch comprising a body having a hand grip portion with a nozzle attached thereto, said body having a mixing chamber communicating with said nozzle and two passages delivering into the inner end of said chamber, a fixed tubular axially extending guide member within said body, a tubular member slidable upon the exterior of said guide member, a member slidable upon the interior of the guide member, said interior and exterior members having valve portions controlling said passages, each of said valve carrying members having a screw threaded portion, two independently rotatable thumb rings mounted on said body adjacent the nozzle attached end of said hand grip portion, said rings being coaxial with said hand grip portion and having screw threaded portions in engagement with the screw threaded portions of said valve carrying members, means for holding said valve carrying members against rotation and means for holding said thumb rings against axial movements.

6. A torch of the character described comprising a hand grip member having a socket at its outer end that includes an internally threaded bore, a counterbore, a passage that opens axially into the inner end of the socket and a second passage that opens to the counterbore laterally of the threaded bore, a nozzle member having a tubular inner end screwed into said threaded bore and a passage communicating with said tubular portion, said tubular portion having lateral openings, a member slidable axially within said tubular end of the nozzle member and having a valve portion for closing said axial passage, an axially movable tubular member slidable in said counterbore exteriorly of the tubular inner end of the nozzle member, said tubular member having a valve portion for closing the passage to said counterbore, and means for actuating said valve carrying members.

7. A torch of the character described comprising a hand grip member having a socket at its outer end that includes an internally threaded bore, a counterbore, a passage that opens axially into the inner end of the socket and a second passage that opens to the counterbore laterally of the threaded bore, a nozzle member having a tubular inner end screwed into said threaded bore and a passage communicating with said tubular portion, said tubular portion having lateral openings, a member slidable axially within said tubular end of the nozzle member and having a valve portion for closing said axial passage, an axially movable tubular member slidable in said counterbore exteriorly of the tubular inner end of the nozzle member, said tubular member having a valve portion for closing the passage to said counterbore, two independently rotatable thumb rings adjacent the nozzle attached end of said hand grip member, and means operatively connecting one of said rings to each of said valve carrying members to actuate the same.

8. A torch of the character described comprising a hand grip member having a socket at its outer end that includes an internally threaded bore, a counterbore, a passage that opens axially into the inner end of the socket and a second passage that opens to the counterbore laterally of the threaded bore, a nozzle member having a tubular inner end screwed into said threaded bore and a passage communicating with said tubular portion, said tubular portion having lateral openings, a member slidable axially within said tubular end of the nozzle member and having a valve portion for closing said axial passage, said member having an externally screw threaded portion, an axially movable tubular member slidable in said counterbore exteriorly of the tubular end of said nozzle member, said tubular member having an externally screw threaded portion and a valve portion for closing said second passage, two independently rotatable thumb rings each having an internally threaded portion engaging the screw threaded portion of one of the valve carrying members, means for holding the valve carrying members against rotation, and means for holding the thumb rings against axial movements.

9. In a torch of the character described a hand grip member having an internally threaded bore at one end and a passage opening to the inner end of said bore, a nozzle member having an inner end portion of reduced diameter screwed into said threaded bore, said nozzle portion having an axial passage, the inner end of said nozzle member having an axial bore of larger diameter than said passage and a diametrical slot, a cross head slidable axially in said slot said cross head having a central screw threaded opening and having ends projecting through the slots and provided with screw threads, a valve member having its outer end screwed into said central opening of the cross head and its inner end of reduced diameter and provided with an end portion for closing said first mentioned passage, said valve member having an axial bore registering with the passage of the nozzle member and terminating short of the inner end, said valve member having an opening from its axial bore to the space around the reduced inner end thereof, and a thumb ring having threaded engagement with said cross head for actuating the valve member.

TONY SVET.

REFERENCES CITED

The following references are of record in the file of this patent:

UNITED STATES PATENTS

| Number | Name | Date |
|---|---|---|
| 1,078,578 | Gehring et al. | Nov. 11, 1913 |
| 2,232,772 | Crowley et al. | Feb. 25, 1941 |

FOREIGN PATENTS

| Number | Country | Date |
|---|---|---|
| 301,416 | Great Britain | May 4, 1928 |